US012654765B2

(12) United States Patent

Ozawa et al.

(10) Patent No.: US 12,654,765 B2

(45) Date of Patent: Jun. 16, 2026

(54) STEERING CONTROL DEVICE FOR VEHICLE

(71) Applicant: TOYOTA JIDOSHA KABUSHIKI KAISHA, Toyota (JP)

(72) Inventors: Kazuhiro Ozawa, Toyota (JP); Yosuke Yamashita, Nagoya (JP); Shintaro Takayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 18/786,818

(22) Filed: Jul. 29, 2024

(65) Prior Publication Data

US 2025/0145211 A1 May 8, 2025

(30) Foreign Application Priority Data

Nov. 7, 2023 (JP) .................................. 2023-190425

(51) Int. Cl.
*B62D 5/04* (2006.01)

(52) U.S. Cl.
CPC .................................. *B62D 5/0481* (2013.01)

(58) Field of Classification Search
CPC ............. B62D 5/0481; B60T 2270/414; B60T 2260/02
See application file for complete search history.

(56) References Cited

U.S. PATENT DOCUMENTS

| | | | | |
|---|---|---|---|---|
| 12,286,171 B2 * | 4/2025 | Koudai | .................. | B60K 28/10 |
| 2011/0057510 A1 * | 3/2011 | Yamashita | ............... | B62D 6/02 |
| | | | | 307/10.1 |
| 2020/0169304 A1 * | 5/2020 | Chen | ...................... | H04L 5/0048 |
| 2023/0117373 A1 * | 4/2023 | Nagashima | ............... | H02P 5/74 |
| | | | | 701/41 |
| 2023/0126878 A1 * | 4/2023 | Koudai | .................. | B60K 28/10 |
| | | | | 701/41 |
| 2023/0286569 A1 | 9/2023 | Miyake et al. | | |

FOREIGN PATENT DOCUMENTS

| | | |
|---|---|---|
| JP | 2023-000522 A | 1/2023 |
| JP | 2023-064437 A | 5/2023 |
| JP | 2023-131351 A | 9/2023 |

* cited by examiner

*Primary Examiner* — Long T Tran

(74) *Attorney, Agent, or Firm* — SoraIP, Inc.

(57) ABSTRACT

The vehicle fixing control unit fixes the vehicle during the charging of the backup power supply, and the vehicle fixing by the vehicle fixing device is not released regardless of the vehicle fixing release request by the operation of the vehicle fixing device operation switch until the remaining charge amount of the backup power supply reaches the fail-safe executable remaining charge amount determination value set in advance. Thus, when the vehicle travels with the vehicle fixing released, since at least the remaining charge amount is stored up to the remaining charge amount determination value that can be performed in a fail-safe manner enough to operate the steer-by-wire system at the time of starting the vehicle traveling, it is possible to sufficiently function the vehicle steering control device even in an emergency.

3 Claims, 2 Drawing Sheets

STEERING CONTROL DEVICE FOR VEHICLE

CROSS-REFERENCE TO RELATED APPLICATION

This application claims priority to Japanese Patent Application No. 2023-190425 filed on Nov. 7, 2023, incorporated herein by reference in its entirety.

BACKGROUND

1. Technical Field

The present disclosure relates to a steering control device for a vehicle including a main power supply and a backup power supply to be used when the main power supply has an abnormality.

2. Description of Related Art

There is known a steering control device (steer-by-wire system) for a vehicle in which a steering wheel and a steered wheel are mechanically separated from each other and a steering angle motor that changes a steering angle of the steered wheel is controlled in response to a steering operation on the steering wheel. A steering control device described in Japanese Unexamined Patent Application Publication No. 2023-131351 (JP 2023-131351 A) is an example.

Such a steering control device for a vehicle may include a main power supply and a backup power supply to be used when the main power supply has an abnormality. The control between the main power supply and the backup power supply is described in Japanese Unexamined Patent Application Publication No. 2023-000522 (JP 2023-000522 A) though it is related to a shift-by-wire system and a brake system. In this case, the backup power supply is charged when a vehicle system is started up, and is controlled to back up the main power supply in the event of failure in the main power supply.

SUMMARY

In order that the steer-by-wire system function in an emergency, the backup power supply needs to store, at least at the start of traveling, a sufficient remaining charge amount (stored electric power) to operate the steer-by-wire system.

However, there is no description in the above related art from the viewpoint that a sufficient remaining charge amount is stored in the backup power supply at the start of traveling of the vehicle. There is a concern that the function of the steering control device for the vehicle is not sufficiently obtained.

The present disclosure has been made in view of the above circumstances. The present disclosure provides a steering control device for a vehicle in which a sufficient remaining charge amount (stored electric power) to operate a steer-by-wire system even when a main power supply has an abnormality is stored at the start of traveling of the vehicle.

The gist of the present disclosure is (a) a steering control device for a vehicle in which a steering wheel and a steered wheel are mechanically separated from each other, a steering angle motor configured to change a steering angle of the steered wheel in response to a steering operation on the steering wheel is controlled using electric power in a main power supply, and a backup power supply configured to back up the main power supply starts to be charged when the vehicle is powered on, (b) the steering control device including a vehicle fixing control unit configured to fix the vehicle during charging of the backup power supply, and configured not to terminate fixing of the vehicle regardless of a vehicle fixing termination request before a remaining charge amount of the backup power supply reaches a preset fail-safe executable remaining charge amount determination value.

In the steering control device for the vehicle according to the present disclosure, the vehicle fixing control unit fixes the vehicle during the charging of the backup power supply. The fixing of the vehicle is not terminated regardless of the vehicle fixing termination request before the remaining charge amount of the backup power supply reaches the preset fail-safe executable remaining charge amount determination value. Therefore, when the vehicle travels with its fixing terminated, the remaining charge amount (stored electric power) is stored, at the start of traveling of the vehicle, up to the fail-safe executable remaining charge amount determination value that is sufficient to operate the steer-by-wire system. Thus, the steer-by-wire system can sufficiently function in an emergency.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the drawings.

Figure 1:
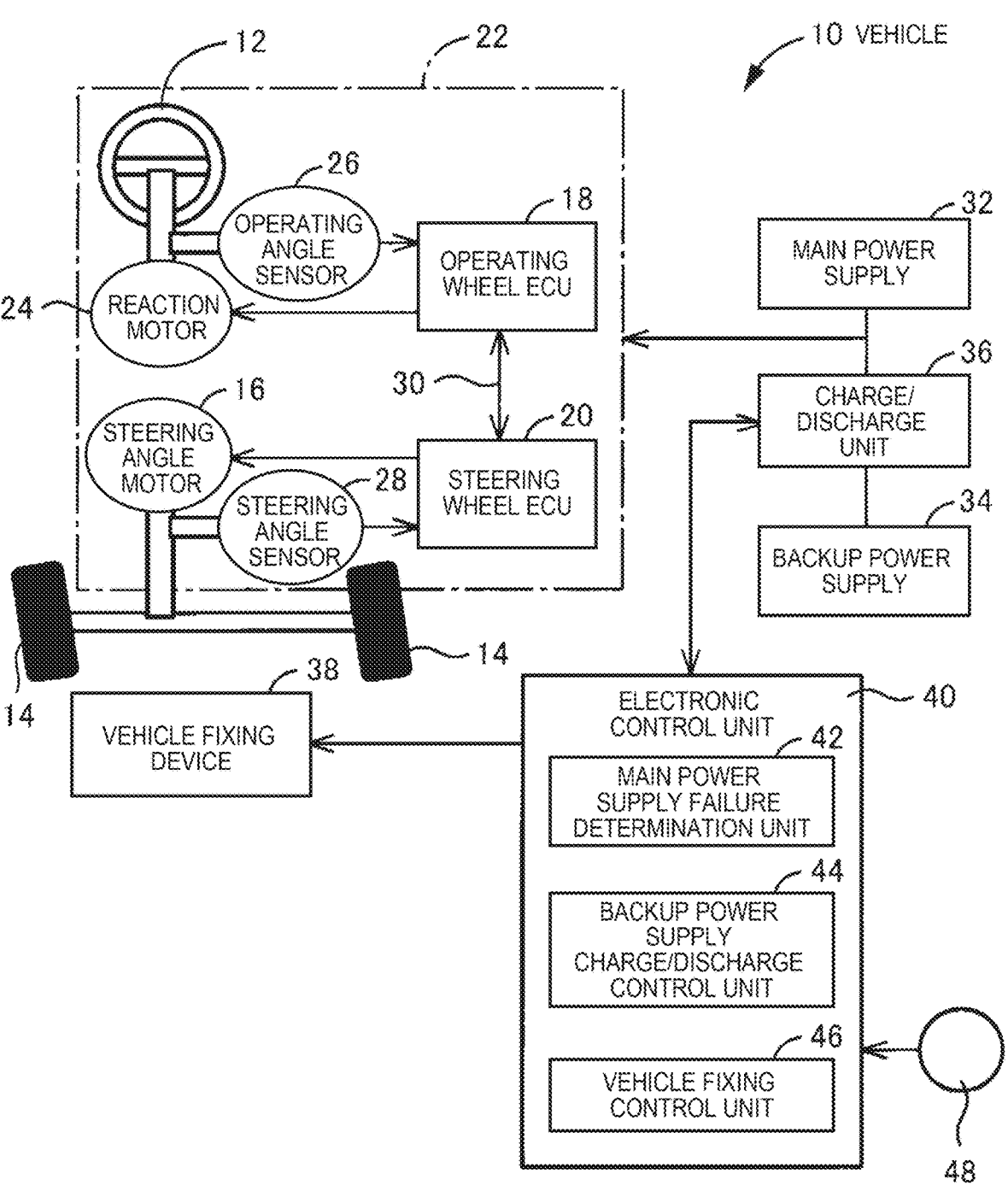
FIG. 1 is a diagram illustrating an example of a vehicle steering device and a control device to which the present disclosure is applied.

In FIG. 1, a vehicle 10 is provided with a steering wheel (operation wheel) 12 and a pair of steered wheels 14 (for example, front wheels) mechanically separated from each other, and a vehicle steering control device (steer-by-wire system) 22 is provided. In the vehicle steering control device 22, the operating wheel ECU18 and the steered wheel ECU20 control the steering angle motor 16 that changes the steering angle $\theta w$ of the steered wheel 14 so that the steering angle $\theta w$ of the steered wheel 14 follows the target steering angle $\theta t$ determined according to the steering angle $\theta s$ by the steering operation of the steering wheel 12.

The steering wheel 12 is provided with a reaction force motor 24 for generating a steering reaction force on the steering wheel 12 and an operation angle sensor 26 for detecting a steering angle $\theta s$ of the steering wheel 12. The steered wheel 14 is provided with a steering angle motor 16 for changing the steering angle $\theta w$ of the steered wheel 14 and a steering angle sensor 28 for detecting the steering angle $\theta w$ of the steered wheel 14. The operating wheel ECU18 and the steered wheel ECU20 are communicably connected to each other via a communication line 30.

The operating wheel ECU18 and the steered wheel ECU20 determine the target steering angle θt based on the steering angle θs of the steering wheel 12 based on a predetermined rotational ratio when the steering wheel 12 and the steered wheel 14 are mechanically connected, and drive the steering angle motor 16 so that the steering angle θw of the steered wheel 14 follows the target steering angle θt to control the steering angle θw of the steered wheel 14. Further, the operating wheel ECU18 and the steered wheel ECU20 control the reaction force motor 24 so as to apply a reaction force corresponding to the road surface condition, the vehicle speed, and the steering angle θw (clearance angle) of the steered wheel 14 to the steering wheel 12. The operating wheel ECU18 and the steered wheel ECU20 do not necessarily have to be formed separately, and may be formed of a single computer.

The vehicle 10 is provided with a main power supply 32 that supplies power to at least the vehicle steering control device 22, a backup power supply (battery) 34 that is used instead of the main power supply 32 when the main power supply 32 fails, and a charge/discharge unit 36 that controls charge and discharge of the backup power supply 34. The main power supply 32 is composed of a secondary battery that functions as a power supply for the vehicle steering control device (steer-by-wire system) 22. For example, when the vehicle 10 is a HEV vehicle, BEV vehicle, PHEV vehicle, FCEV vehicle, or the like, the main power supply 32 is a low-voltage (12V) auxiliary battery that is charged through a DCDC converter from the drive high-voltage battery. The failure of the main power supply 32 refers to a failure of DCDC converters and a decrease in the power of the auxiliary battery. The backup power supply 34 may be a secondary battery, but is preferably composed of an electric double layer capacitor.

The charge/discharge unit 36 includes DCDC converters and the like, and charges the backup power supply 34 using the electric power supplied from the main power supply 32 in accordance with a command from the electronic control unit 40. Further, the charge/discharge unit 36 discharges from the backup power supply 34 in accordance with a command from the electronic control unit 40, and supplies electric power to the vehicle steering control device (steer-by-wire system) 22.

Further, the vehicle 10 is provided with a vehicle fixing device 38 that blocks the rotation of the pair of steered wheels 14 and the pair of rear wheels (not shown) in accordance with a command from the electronic control unit 40 and fixes the vehicle 10. The vehicle fixing device 38 includes, for example, any one of a parking lock mechanism, a parking brake, an electric brake, a hydraulic brake, and a shift system control.

The electronic control unit 40 includes, for example, a microcomputer, and performs arithmetic processing of an input signal in accordance with a program stored in advance to control the charge/discharge unit 36 and the vehicle fixing device 38. The electronic control unit 40 functionally includes a main power supply failure determination unit 42, a backup power supply charge/discharge control unit 44, a vehicle fixing control unit 46, and the like.

The main power supply failure determination unit 42 determines a failure of the main power supply 32, such as an output abnormality of the main power supply 32, based on, for example, an output voltage of the main power supply 32.

Figures 2, 3:
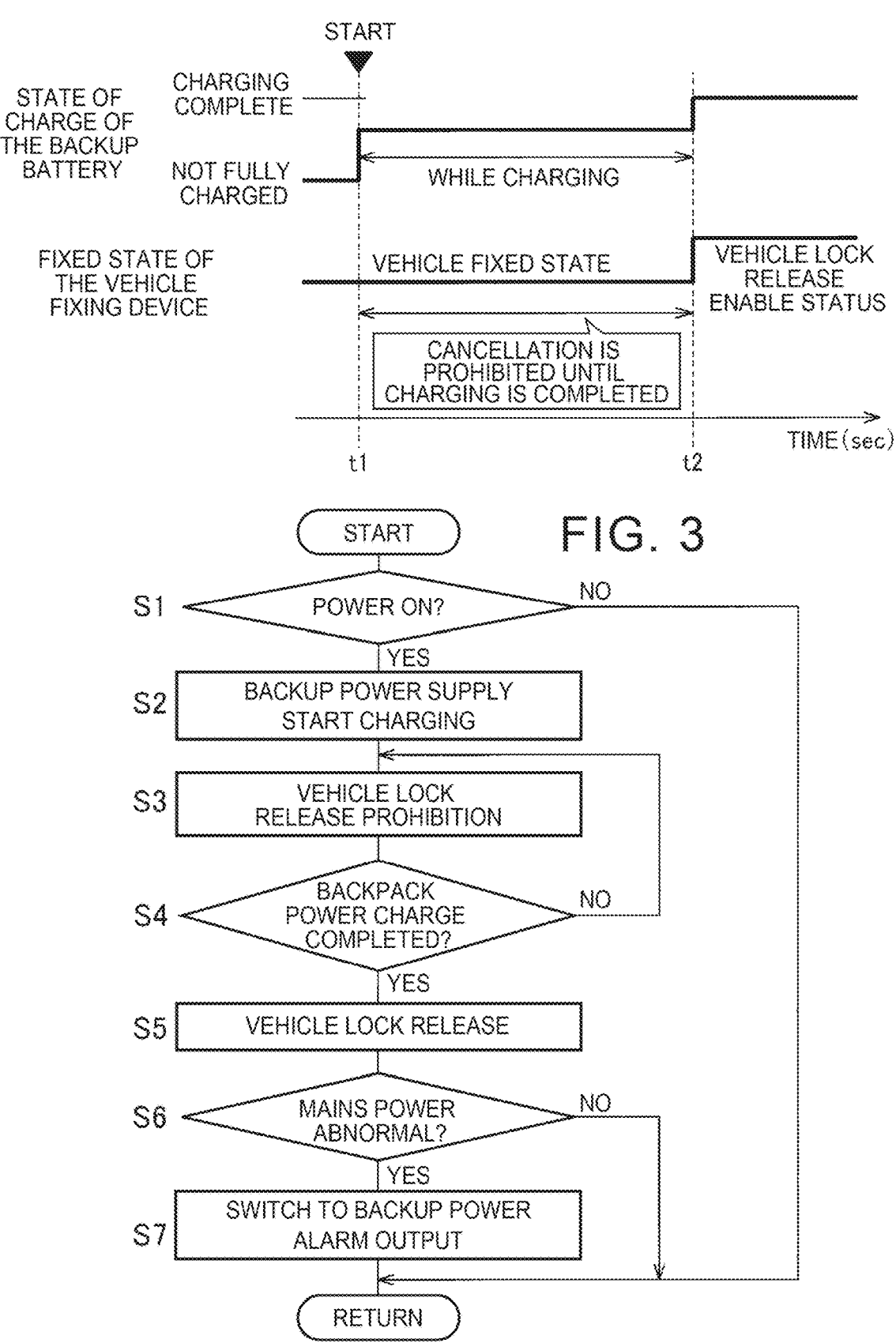
FIG. 2 is a time chart illustrating a main part of a control operation performed by the control device of FIG. 1.
FIG. 3 is a flowchart illustrating a main part of a control operation performed by the control device of FIG. 1.

The backup power supply charge/discharge control unit 44, in a state where the vehicle 10 is fixed (stopped) by the vehicle fixing device 38, when the vehicle power is turned ON by a power-on operation such as a power-on switch or an ignition switch (t1 time point indicating the start of FIG. 2), starts charging the backup power supply 34, and when the remaining charge amount SOC of the backup power supply 34 reaches the backup remaining charge amount determination value SOC1 set in advance and charging is completed, the charging is terminated (t2 time point in FIG. 2). In addition, the backup power supply charge/discharge control unit 44 determines whether or not the remaining charge amount SOC of the backup power supply 34 has reached the fail-safe executable remaining charge amount determination value SOC1 set in advance during charging of the backup power supply 34.

The vehicle fixing control unit 46 normally performs vehicle fixing by the vehicle fixing device 38 and releasing from the vehicle fixing in response to the releasing operation of the vehicle fixing device release operation switch 48. However, when the backup power supply 34 is being charged, even if there is a release operation for releasing the vehicle 10 from the fixed state by the operation of the vehicle fixing device release operation switch 48, the fixing of the vehicle 10 is continued until it is determined by the backup power supply charge/discharge control unit 44 that the remaining charge amount SOC of the backup power supply 34 has reached a preset fail-safe executable remaining charge amount determination value SOC1 sufficient to cause the steer-by-wire system to function for a predetermined time or a predetermined distance. The fail-safe executable remaining charge amount determination value SOC1 is a remaining charge amount SOC of the backup power supply 34, which is determined based on the terminal voltage of the backup power supply 34, so that the fail-safe operation can be sufficiently performed at the time of failure of the vehicular power supply. When the backup power supply charge/discharge control unit 44 determines that the remaining charge amount SOC of the backup power supply 34 has reached the fail-safe executable remaining charge amount determination value SOC1 set in advance and the charge has been completed, the vehicle fixing control unit 46 releases the vehicle fixing by the vehicle fixing device 38 in response to an operation of releasing the fixing of the vehicle 10.

As the shift operation device, in the vehicle 10 mounted with a momentary shifter having an automatic return type shift lever for automatically returning from the D position, the R position, the N position to the H position (home position) and a P push button switch corresponding to the vehicle fixing device release operation switch 48, the vehicle fixing control unit 46, in the case of charging the backup power supply 34 in the parking lock state, the parking lock release operation by the P push button switch, at the time of power on (activation) at the N position, the vehicle fixing device release operation switch 48. It does not accept the operation to the travel position (D position, R position to which the driving force is output) by the corresponding automatic return type shift lever.

Further, in the vehicle 10 in which a mechanical lever shifter having a shift lever that is sequentially operated to the P position, the R position, the N position, and the D position is mounted as the shift operation device, the vehicle fixing control unit 46 locks the shift lever with the electric lock pin so that the shift lever corresponding to the vehicle fixing device release operation switch 48 does not move from the P position or the N position when the backup power supply 34 is being charged in the parking lock state. While the backup power supply 34 is being charged, the shift lever itself can be operated, but the vehicle fixing control unit 46 invalidates the operation of the shift lever to the traveling position (the D position and the R position at which the driving force is output).

Further, in the vehicle 10 on which the electric parking brake is mounted, the vehicle fixing control unit 46 does not accept the release operation of the electric parking brake by the vehicle fixing device release operation switch 48 when the backup power supply 34 is being charged in the operating state of the electric parking brake.

Further, in the vehicle 10 on which the manual parking brake is mounted, when the backup power supply 34 is being charged in the operating state of the manual parking brake, the vehicle fixing control unit 46 locks the manual parking brake with the electric lock pin so as not to move the manual parking brake toward the lock release side, and disables the manual parking brake release operation.

Further, in the vehicle 10 equipped with the hydraulic brake for braking the rotation of the wheels by using the brake hydraulic pressure generated by the operation of the brake pedal, the vehicle fixing control unit 46 performs control for maintaining the brake hydraulic pressure so that the hydraulic brake is not released even if the brake pedal corresponding to the vehicle fixing device release operation switch 48 is released when the backup power supply 34 is being charged in the operating state of the hydraulic brake.

FIG. 3 is a flowchart for explaining a main part of the control operation of the electronic control unit 40. In S1 illustrated in FIG. 3, it is determined whether or not power-on (power ON) has been performed when the vehicle 10 is being fixed (stopped) by the vehicle fixing device 38. If the determination of S1 is negative, S1 or less is repeated. When the determination of S1 is affirmative, in S2, charging of the backup power supply 34 is started, and even if there is a release operation of releasing the vehicle 10 from the fixed state by the operation of the vehicle fixing device release operation switch 48 in S3, the release of the vehicle fixing device 38 is prohibited, and the fixing of the vehicle 10 is continued.

In S4, it is determined whether or not the remaining charge amount SOC of the backup power supply 34 has reached the fail-safe executable remaining charge amount determination value SOC1 set in advance. If the determination of S4 is negative, the following S3 is repeated. When the determination of S4 is affirmative, in S5, the vehicle fixing device 38 releases the vehicle fixing, and when the vehicle fixing device release operation switch 48 releases the vehicle fixing device, the vehicle fixing device 38 releases the vehicle fixing.

Next, in S6, it is determined whether or not the main power supply 32 is abnormal. If the determination of S6 is negative, the routine is terminated. When the determination of S6 is affirmative, in S7, the main power supply 32 is switched to the backup power supply 34 to maintain the function of the vehicle steering control device (steer-by-wire system) 22, and a report indicating an anomaly of the main power supply 32 is outputted.

As described above, according to the vehicle steering control device 22 of the present embodiment, the vehicle 10 is fixed while the backup power supply 34 is being charged by the vehicle fixing control unit 46. Until the remaining charge amount SOC of the backup power supply 34 reaches the fail-safe executable remaining charge amount determination value SOC1 set in advance, the vehicle fixing by the vehicle fixing device 38 is not released regardless of the vehicle fixing release request by the operation of the vehicle fixing device release operation switch 48. As a result, at least the remaining charge amount (stored electric power) SOC is stored up to the remaining charge amount determination value SOC1 which is enough to activate the steer-by-wire system at the time of starting the travel of the vehicle when the vehicle fixing is released. Therefore, the vehicle steering control device (steer-by-wire system) 22 can sufficiently function even in an emergency.

Although the examples of the present disclosure have been described in detail with reference to the drawings, the present disclosure also applies to other modes.

For example, the vehicle 10 of the above-described embodiment may be any of a vehicle equipped with an engine as a power source, a BEV vehicle equipped with an electric motor as a power source, a HEV vehicle equipped with an engine and an electric motor as a power source, a PHEV vehicle, a FCEV vehicle, and the like.

It should be noted that the embodiment described above is merely one embodiment, and the present disclosure can be implemented in a mode in which various changes and improvements are made based on the knowledge of those skilled in the art.

What is claimed is:

1. A vehicle comprising:
a steer-by-wire system including a steering wheel, steered wheels, and a steering angle motor, the steering wheel and the steered wheels being mechanically separated from each other, the steering angle motor being configured to change a steering angle of the steered wheels in response to a steering operation on the steering wheel;
a main power supply configured to provide electric power to the steering angle motor;
a backup power supply configured to start to be charged, in response to the vehicle being powered on;
a processor configured to
determine whether the main power supply is abnormal, and
in response to a determination that the main power supply is abnormal,
switch power supply to the steering angle motor from the main power supply to the backup power supply, and
output a report that indicates an anomaly of the main power supply; and
a hydraulic brake for braking rotation of wheels of the vehicle with hydraulic pressure generated by a depressing operation of a brake pedal, wherein
the processor is further configured to
determine whether a state of charge of the backup power supply has reached a predetermined value, after starting to charge the backup power supply, and
maintain the hydraulic pressure even in a state where the brake pedal is released, while the state of charge is determined not to have reached the predetermined value.

2. The vehicle according to claim 1, further comprising an electric parking brake, wherein the processor is further configured not to accept a release operation of the electric parking brake while the state of charge is determined not to have reached the predetermined value in a state where the electric parking brake is operated.

3. The vehicle according to claim 1, further comprising a manual parking brake, wherein the processor is further configured to engage an electric lock pin to prevent the manual parking brake from moving toward a release position while the state of charge is determined not to have reached the predetermined value in a state where the manual parking brake is operated.

\* \* \* \* \*